US010036274B2

(12) United States Patent
Ward

(10) Patent No.: US 10,036,274 B2
(45) Date of Patent: Jul. 31, 2018

(54) VARIABLE PIVOT CENTER VTG VANES AND VANE PACK ASSEMBLY

(71) Applicant: BorgWarner Inc., Auburn Hills, MI (US)

(72) Inventor: Daniel N. Ward, Asheville, NC (US)

(73) Assignee: BorgWarner Inc., Auburn Hills, MI (US)

(*) Notice: Subject to any disclaimer, the term of this patent is extended or adjusted under 35 U.S.C. 154(b) by 372 days.

(21) Appl. No.: 14/655,089

(22) PCT Filed: Dec. 9, 2013

(86) PCT No.: PCT/US2013/073814
§ 371 (c)(1),
(2) Date: Jun. 24, 2015

(87) PCT Pub. No.: WO2014/107270
PCT Pub. Date: Jul. 10, 2014

(65) Prior Publication Data
US 2015/0322849 A1 Nov. 12, 2015

Related U.S. Application Data

(60) Provisional application No. 61/748,921, filed on Jan. 4, 2013.

(51) Int. Cl.
F01D 17/16 (2006.01)
F02B 37/24 (2006.01)

(52) U.S. Cl.
CPC ........... F01D 17/165 (2013.01); F01D 17/16 (2013.01); F02B 37/24 (2013.01); F05D 2220/40 (2013.01); Y02T 10/144 (2013.01)

(58) Field of Classification Search
CPC .... F04D 29/46; F04D 29/462; F04D 29/4213; F04D 29/56; F04D 29/563; F01D 17/16; F01D 17/165; F02B 37/24; F02C 9/20
See application file for complete search history.

(56) References Cited

U.S. PATENT DOCUMENTS 8,485,778 B2 * 7/2013 Zhang ................ F01D 9/042
415/163
2010/0068040 A1 3/2010 Nakamura
(Continued)

FOREIGN PATENT DOCUMENTS

CN 101985897 A 3/2011
JP 2002332862 A 11/2002

OTHER PUBLICATIONS

Chinese Office Action (with English language translation) dated Jan. 25, 2017, in Chinese Application No. 201380065711.0.

Primary Examiner — Eldon Brockman
(74) Attorney, Agent, or Firm — Eric L. Doyle; Stephan A. Pendorf; Patent Central LLC

(57) ABSTRACT

A vane pack assembly (14) for a variable turbine geometry turbocharger is a stand-alone assembly and can be assembled and transported apart from the turbocharger. The vane pack assembly (14) includes a plurality of guide vanes (16) spaced apart in a circumferential direction and a plurality of pivot centers (38). Each one of the pivot centers (38) corresponds with one of the guide vanes (16). A location of the pivot centers (38) relative to the guide vanes (16) changes as an angular position of the guide vanes (16) is adjusted.

13 Claims, 8 Drawing Sheets

(56) References Cited

U.S. PATENT DOCUMENTS

| | | |
|---|---|---|
| 2010/0098529 A1 | 4/2010 | Roby et al. |
| 2011/0014032 A1 | 1/2011 | Boening et al. |
| 2011/0110768 A1 | 5/2011 | Nikolic et al. |
| 2011/0131977 A1 | 6/2011 | Akita |

* cited by examiner

VARIABLE PIVOT CENTER VTG VANES AND VANE PACK ASSEMBLY

CROSS-REFERENCE TO RELATED APPLICATION

This application claims priority to and all benefits of U.S. Provisional Application No. 61/748,921 filed on Jan. 4, 2013, and entitled "Variable Pivot Center VTG Vanes And Vane Pack Assembly."

BACKGROUND OF THE INVENTION

1. Field of the Invention

This invention relates to a variable turbine geometry turbocharger for an internal combustion engine. More particularly, this invention relates to a variable turbine geometry turbocharger having adjustable guide vanes with a variable pivot center.

2. Description of Related Art

A turbocharger is a type of forced induction system used with internal combustion engines. Turbochargers deliver compressed air to an engine intake, allowing more fuel to be combusted, thus boosting an engine's power density without significantly increasing engine weight. Thus, turbochargers permit the use of smaller engines that develop the same amount of power as larger, normally aspirated engines. Using a smaller engine in a vehicle has the desired effect of decreasing the mass of the vehicle, increasing performance, and enhancing fuel economy. Moreover, the use of turbochargers permits more complete combustion of the fuel delivered to the engine, which contributes to the highly desirable goal of reduced emissions.

Turbochargers include a turbine having a turbine housing connected to the engine's exhaust manifold, a compressor having a compressor housing connected to the engine's intake manifold, and a bearing housing connecting the turbine and compressor housings together. The turbine includes a turbine wheel disposed within the turbine housing and the compressor includes a compressor impeller disposed within the compressor housing. The turbine wheel is rotatably driven by a flow of exhaust gas supplied from the exhaust manifold. A shaft is rotatably supported in the bearing housing and couples the turbine wheel to the compressor impeller such that rotation of the turbine wheel causes rotation of the compressor impeller. The shaft connecting the turbine wheel and the compressor impeller defines an axis of rotation. As the compressor impeller rotates, it compresses ambient air entering the compressor housing, thereby increasing the air mass flow rate, airflow density, and air pressure delivered to the engine's cylinders via the engine's intake manifold.

To improve efficiency, responsiveness, or the operating range of turbochargers, it is often advantageous to regulate the flow of exhaust gas to the turbine wheel. One method of regulating the flow of exhaust gas to the turbine wheel is commonly referred to by several names, including Variable Turbine Geometry (VTG), Variable Geometry Turbine (VGT), Variable Nozzle Turbine (VNT), or simply Variable Geometry (VG). VTG turbochargers include a plurality of adjustable guide vanes pivotally supported within a wheel inlet leading to the turbine wheel. The space between adjacent guide vanes constitutes flow channels for regulating the flow of exhaust gas to the turbine wheel. The geometry of the flow channels is adjustable by pivoting the guide vanes within a pre-determined range of angular positions between an open position and a closed position. In the open position, the guide vanes are oriented in a generally radially extending position relative to the axis of rotation of the shaft to allow the flow of exhaust gas through the wheel inlet to the turbine wheel. In the closed position, the guide vanes are oriented in a generally tangentially extending position relative to the axis of rotation of the shaft to block the flow of exhaust gas to the turbine wheel.

To control the boost pressure delivered to the engine, the guide vanes are adjusted to constrict or open the flow channels between adjacent guide vanes. Constricting the flow channels increases the velocity of the exhaust gas impacting the turbine wheel, which causes the turbine wheel to rotate more quickly. Increasing the rotation of the turbine wheel in turn increases the rotation of the compressor impeller, and thereby increases the boost pressure delivered to the engine. Conversely, opening the flow channels decreases the velocity of the exhaust gas impacting the turbine wheel, which causes the turbine wheel to rotate more slowly. Decreasing the rotation of the turbine wheel in turn decreases the rotation of the compressor impeller, and thereby decreases the boost pressure delivered to the engine. The guide vanes also provide a means for controlling and generating exhaust gas back pressure in engines which use Exhaust Gas Recirculation (EGR) to control Nitrogen Oxide (NOx) emissions.

Typically, the guide vanes pivot between the open and closed positions about a fixed pivot post. The pivot post for each guide vane is positioned between a leading edge and a trailing edge of the respective guide vane. When the guide vanes are in the open position it is aerodynamically advantageous to have the pivot post positioned towards the leading edge. This results in a stable aerodynamic flow of the exhaust gas through the flow channels and prevents destructive vane flutter from occurring. However, if the pivot post is positioned towards the leading edge when the guide vanes are in the closed position, the exhaust gas creates a pressure delta forward and rearward of the pivot post that tends to urge the guide vanes to pivot towards the open position. As such, an actuation effort that is undesirably high is required to maintain the guide vanes in the closed position. In contrast, if the pivot post is positioned generally midway between the leading and trailing edges when the guide vanes are in the closed position, the pressure delta forward and rearward of the pivot post is generally equalized.

It is desirable, therefore, to provide a variable turbine geometry turbocharger including adjustable guide vanes having a pivot location which varies as the guide vanes pivot between an open position and a closed position. It is further desirable that the guide vanes pivot about a pivot post that is positioned towards a leading edge when the guide vanes are in the open position and is positioned generally midway between the leading edge and a trailing edge when the guide vanes are in a closed position.

SUMMARY OF THE INVENTION

According to one aspect of the invention, a vane pack assembly for a variable turbine geometry turbocharger is a stand-alone assembly and can be assembled and transported apart from the turbocharger. The vane pack assembly includes a plurality of guide vanes spaced apart in a circumferential direction and a plurality of pivot centers. Each one of the pivot centers corresponds with one of the guide vanes. A location of the pivot centers relative to the guide vanes changes as an angular position of the guide vanes is adjusted.

According to another embodiment of the invention, a vane pack assembly for a variable turbine geometry turbocharger includes a lower vane ring and an upper vane ring spaced apart from the lower vane ring in an axial direction. A plurality of guide vanes is spaced apart in a circumferential direction and is disposed in the axial direction between the lower and upper vane rings. Each one of a plurality of pivot centers corresponds with one of the guide vanes. An adjustment ring is operatively coupled to the guide vanes for varying an angular position of the guide vanes in response to rotation of the adjustment ring. A fixing ring adjacent to the adjustment ring is coupled to the lower vane ring to retain the vane pack assembly together. A location of the pivot centers changes relative to the guide vanes as the angular position of the guide vanes is adjusted in response to rotation of the adjustment ring.

According to yet another embodiment of the invention, a vane pack assembly for a variable turbine geometry turbocharger includes a lower vane ring and an upper vane ring spaced apart from the lower vane ring in an axial direction. A plurality of guide vanes is spaced apart in a circumferential direction between the lower and upper vane rings. Each of the guide vanes includes an elongated slot extending therethrough in the axial direction. A plurality of vane studs is fixedly secured to the lower vane ring. Each of the vane studs extends in the axial direction through the elongated slot in one of the guide vanes. An adjustment ring is operatively coupled to the guide vanes for varying an angular position of the guide vanes in response to rotation of the adjustment ring. A fixing ring adjacent to the adjustment ring is coupled to the lower vane ring to retain the vane pack assembly together. Rotation of the adjustment ring in opposite first and second directions causes pivotal and sliding movement of the guide vanes relative to the vane studs between open and closed positions.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

As is well known in the art, a turbocharger includes a turbine having a turbine housing 10 connected to an engine exhaust manifold, a compressor having a compressor housing connected to an engine intake manifold, and a bearing housing connecting the turbine housing 10 and the compressor housing together. A turbine wheel is disposed within the turbine housing 10 and a compressor impeller is disposed within the compressor housing. The turbine wheel is rotatably driven by exhaust gas supplied from the exhaust manifold. A shaft is rotatably supported in the bearing housing and couples the turbine wheel to the compressor impeller such that rotation of the turbine wheel causes rotation of the compressor impeller. The shaft connecting the turbine wheel and the compressor impeller defines a turbine axis of rotation R1 that extends in an axial direction. As the compressor impeller rotates, it compresses ambient air entering the compressor housing, which is then delivered to the engine's cylinders via the intake manifold.

In order to maximize the performance and efficiency of a turbocharger, it is common to control or regulate the exhaust gas flowing to the turbine wheel using variable turbine geometry (VTG). A vane pack assembly, generally shown at 14, is positioned within the turbine housing 10 to regulate the exhaust gas flowing to the turbine wheel. In the present embodiment, the vane pack assembly 14 is a stand-alone assembly and can be assembled and transported apart from the turbocharger.

Figure 2:
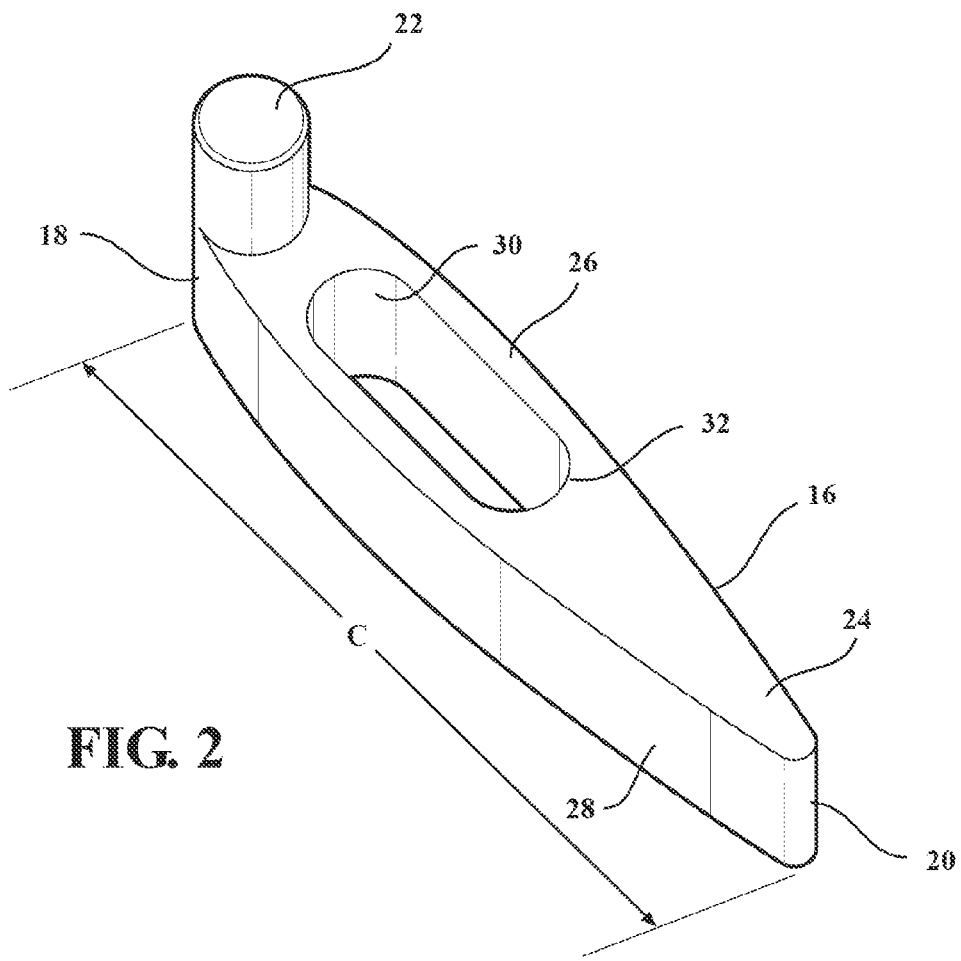
FIG. 2 is a perspective view of a guide vane.

The vane pack assembly 14 includes a plurality of guide vanes 16, one of which is shown in FIG. 2. The guide vanes 16 are arranged circumferentially around the turbine axis of rotation R1 and are located within a wheel inlet 12 leading to the turbine wheel. Flow channels are defined between the guide vanes 16 through which the exhaust gas flows to the turbine wheel. By varying an angular position of the guide vanes 16, a cross-section of the flow channels is adjusted. Each guide vane 16 has a generally aerofoil shape and extends between a leading edge 18 and a trailing edge 20. A straight line connecting the leading edge 18 and the trailing edge 20 defines a chord length C of the guide vane 16. An actuation post 22 extends in the axial direction from a first planar surface 24 of each guide vane 16 adjacent the leading edge 18 thereof. An internal slot 26 extends through each guide vane 16 in the axial direction from the first planar surface 24 to a second planar surface 28 thereof. The internal slot 26 is elongated in a direction of the leading and trailing edges 18, 20 between a forward end 30 and a rearward end 32. In the embodiment shown, the internal slot 26 is substantially linear between the forward and rearward ends 30, 32. However, it is contemplated that the internal slot 26 may be curved between the forward and rearward ends 30, 32 to accommodate a guide vane having a curved profile.

Figure 3:
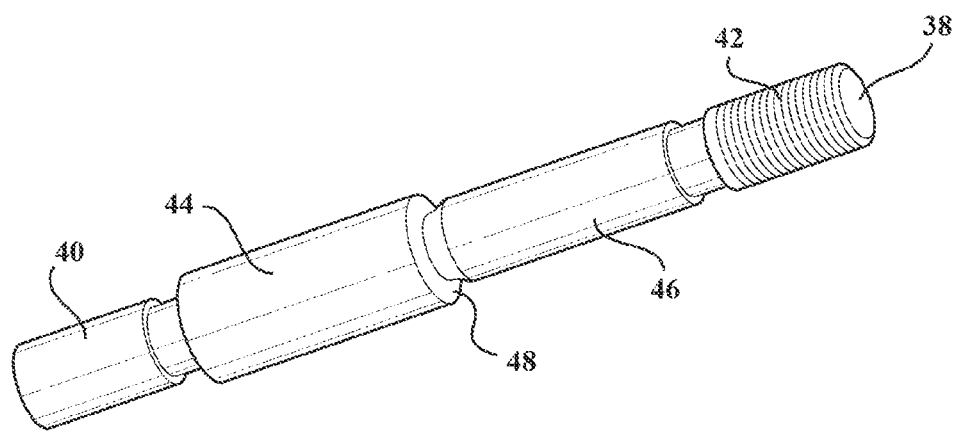
FIG. 3 is a perspective view of a vane stud.

The guide vanes 16 are spaced apart in a circumferential direction and are movably supported between a lower vane ring 34 and an upper vane ring 36. The guide vanes 16 are oriented such that the second planar surface 28 of each guide vane 16 is adjacent to the lower vane ring 34 and the first planar surface 24 of each guide vane 16 is adjacent to the upper vane ring 36. Each guide vane 16 is movably supported on a vane stud 38 that extends in the axial direction. Each vane stud 38 extends in the axial direction between a first threaded end 40 and a second threaded end 42, as shown in FIG. 3. The lower vane ring 34 includes a plurality of threaded bores (not shown) spaced apart in the circumferential direction. The first threaded end 40 of each vane stud 38 is screwed into a corresponding one of the threaded bores such that the vane studs 38 are fixedly secured to the lower vane ring 34.

Between the first and second threaded ends 40, 42, each vane stud 38 includes a vane portion 44 and an adjusting portion 46. The vane portion 44 is adjacent to the first threaded end 40 and the adjusting portion 46 is adjacent to the second threaded end 42 and the vane portion 44. The vane portion 44 has a first outer diameter and the adjusting portion 46 has a second outer diameter. The first outer diameter of the vane portion 44 is larger than the second outer diameter of the adjusting portion 46 such that a shoulder 48 is defined between the vane portion 44 and the adjusting portion 46.

Figure 4:
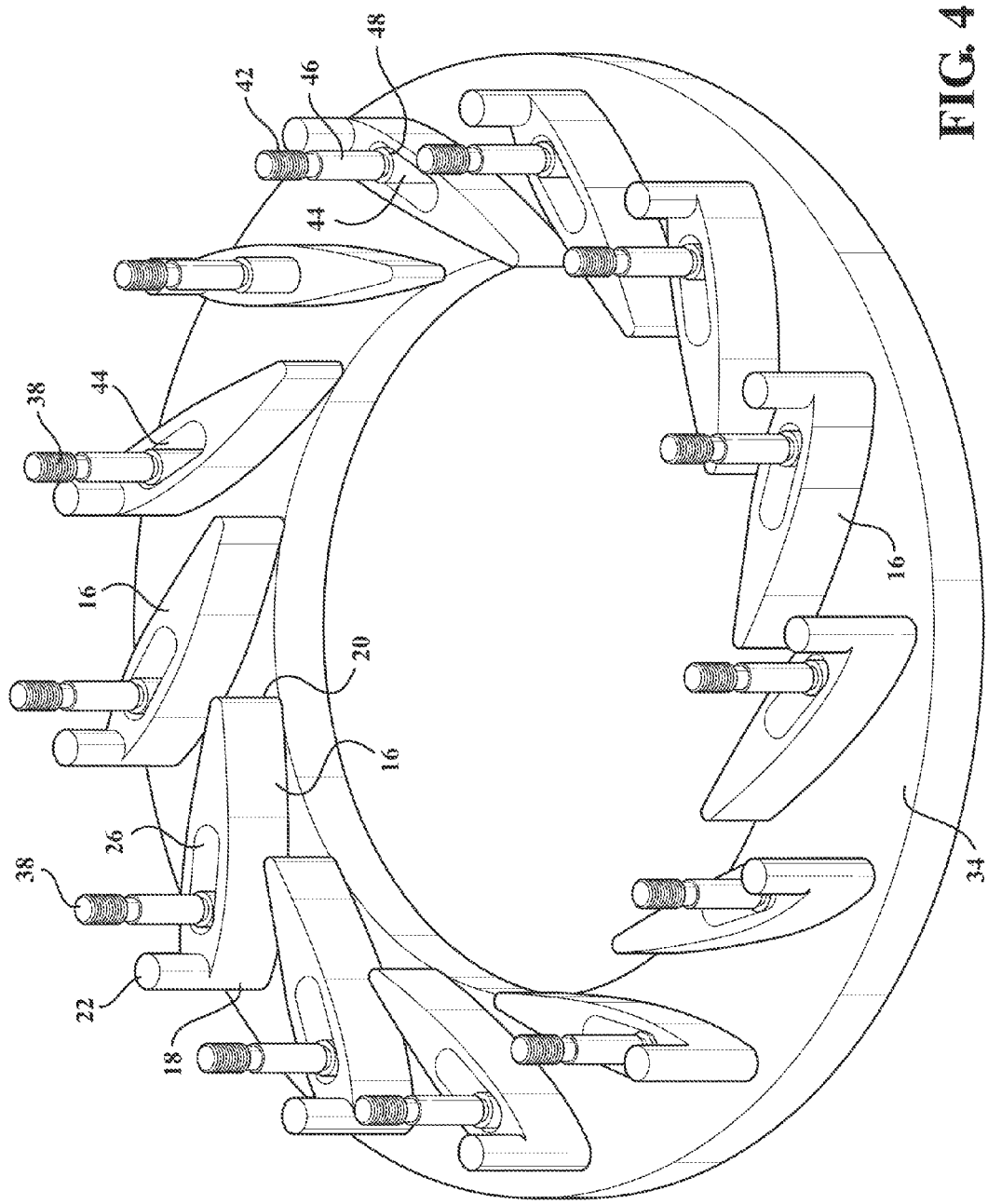
FIG. 4 is a perspective view of a partially assembled vane pack assembly illustrating a lower vane ring, a plurality of vane studs, and a plurality of guide vanes.

Referring to FIG. 4, each vane stud 38 extends through the internal slot 26 in one of the guide vanes 16 such that the first outer diameter of the vane portion 44 engages with inner walls of the internal slot 26. In an alternative embodiment, it is contemplated that a rectangular block may be disposed on the vane portion 44 of each vane stud 38. The rectangular block pivots relative to the vane stud 38 and opposing faces of the rectangular block engage the inner walls of the internal slot 26. The rectangular blocks increase the contact area between the vane studs 38 and the inner walls of the internal slots 26, thereby reducing wear and increasing durability.

Figure 5:
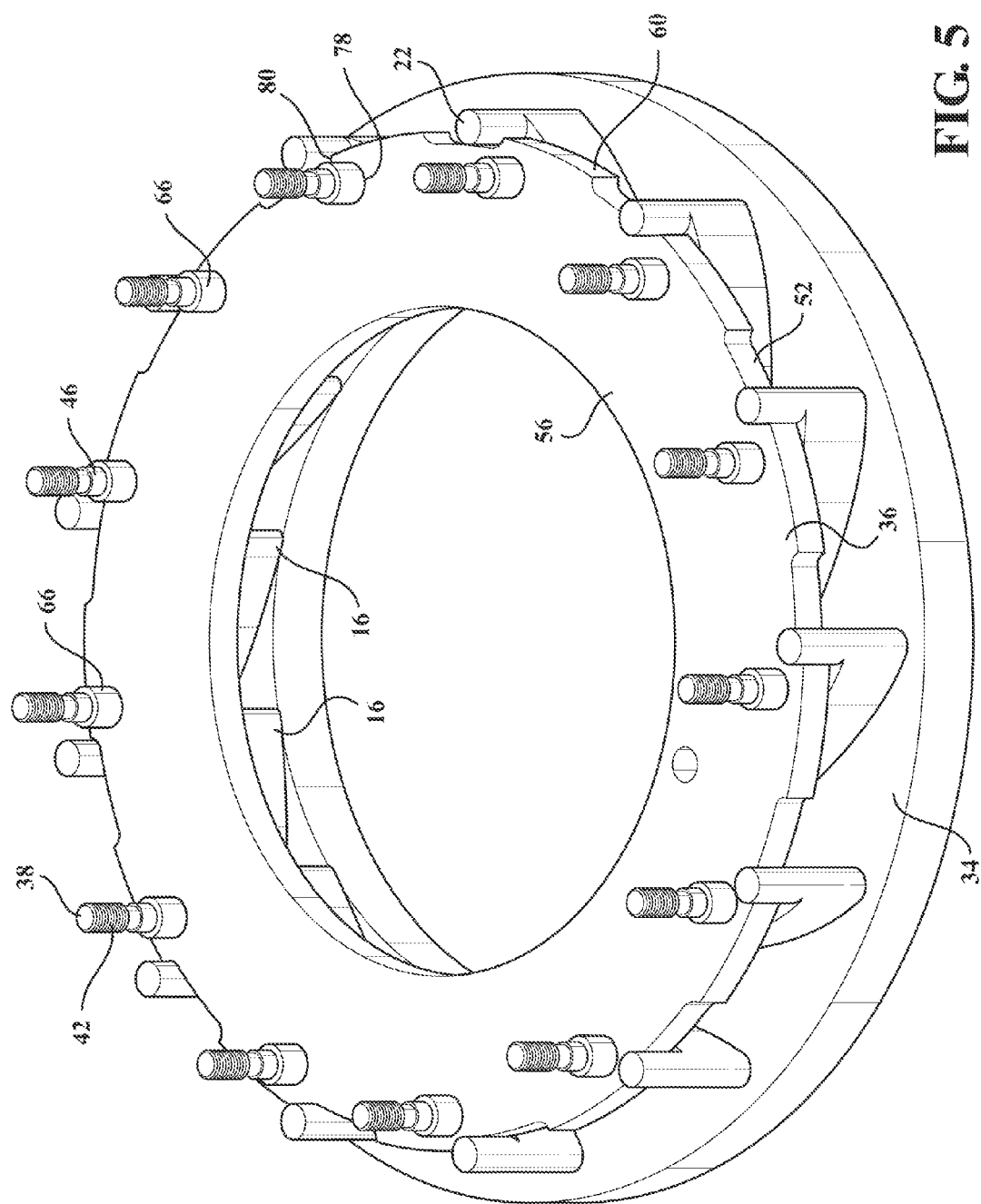
FIG. 5 is a perspective view of a partially assembled vane pack assembly illustrating the lower vane ring, the plurality of vane studs, the plurality of guide vanes, and an upper vane ring.

The upper vane ring 36 includes a plurality of bores (not shown) spaced apart in the circumferential direction. The upper vane ring 36 is fitted over the vane studs 38 such that the vane studs 38 extend through the plurality of bores, as shown in FIG. 5. More specifically, the adjusting portion 46 of each vane stud 38 extends through a corresponding one of the bores in the upper vane ring 36. A first side 52 of the upper vane ring 36 faces the first planar surface 24 of the guide vanes 16 and abuts the shoulder 48 of each vane stud 38 to position the upper vane ring 36 in the axial direction relative to the lower vane ring 34. As such, the vane studs 38 control the spacing between the lower and upper vane rings 34, 36 to provide adequate clearance for the guide vanes 16.

Figure 10:
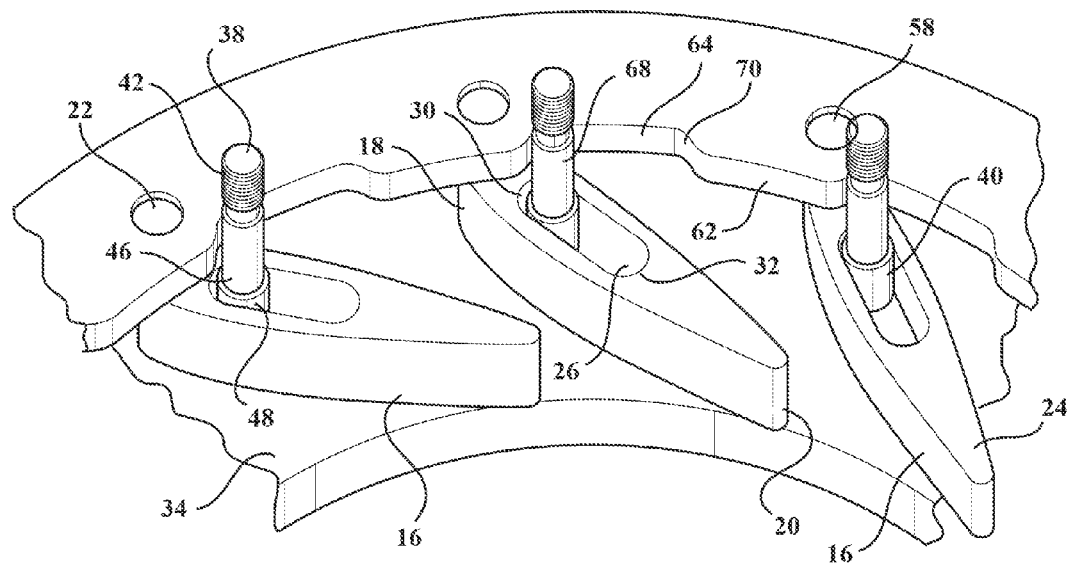
FIG. 10 is a fragmentary, perspective view of the vane pack assembly illustrating the guide vanes in an open position with the upper vane ring and the fixing ring removed for clarity.
Figure 11:
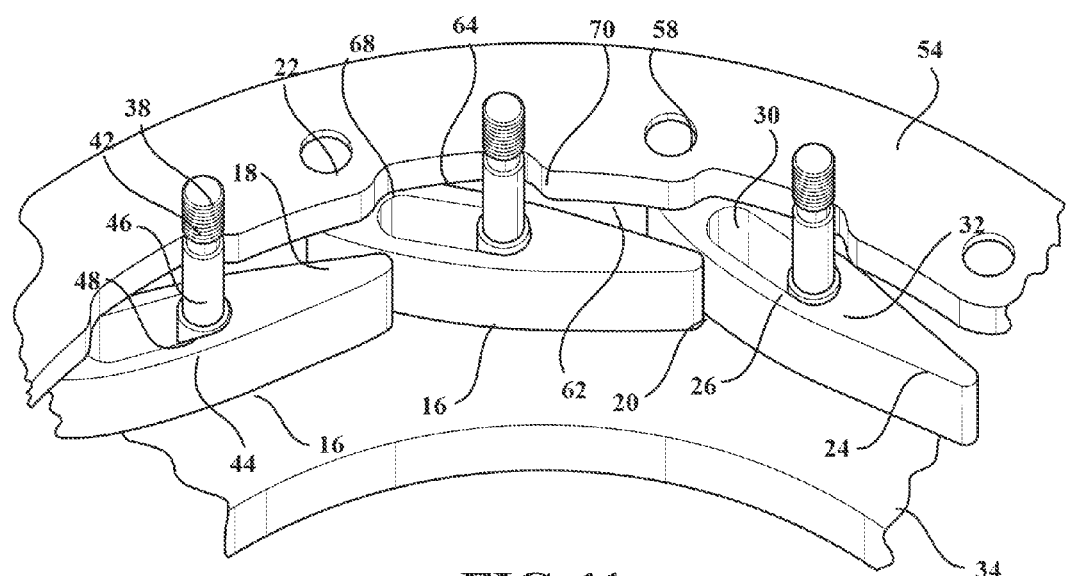
FIG. 11 is a fragmentary, perspective view of the vane pack assembly illustrating the guide vanes in a closed position with the upper vane ring and the fixing ring removed for clarity.

An adjustment ring 54 is provided for varying the angular position of the guide vanes 16 between an open position, shown in FIG. 10, and a closed position, shown in FIG. 11. In the open position, the guide vanes 16 are positioned generally radially relative to the turbine axis of rotation R1, thereby allowing the exhaust gas to flow through the wheel inlet 12 to the turbine wheel. In the closed position, the guide vanes 16 are positioned generally tangentially relative to the turbine axis of rotation R1, thereby blocking the exhaust gas from flowing through the wheel inlet 12 to the turbine wheel. The guide vanes 16 are adjustable through a range of angular positions between the open position and the closed position depending on the flow of exhaust gas to the turbine wheel that is desired. Rotational movement of the adjustment ring 54 about the turbine axis of rotation R1 in a first direction (clockwise when viewed from the Figures) causes movement of the guide vanes 16 towards the open position. In contrast, rotational movement of the adjustment ring 54 about the turbine axis of rotation R1 in a second direction (counterclockwise when viewed from the Figures) causes movement of the guide vanes 16 towards the closed position.

Figure 1:
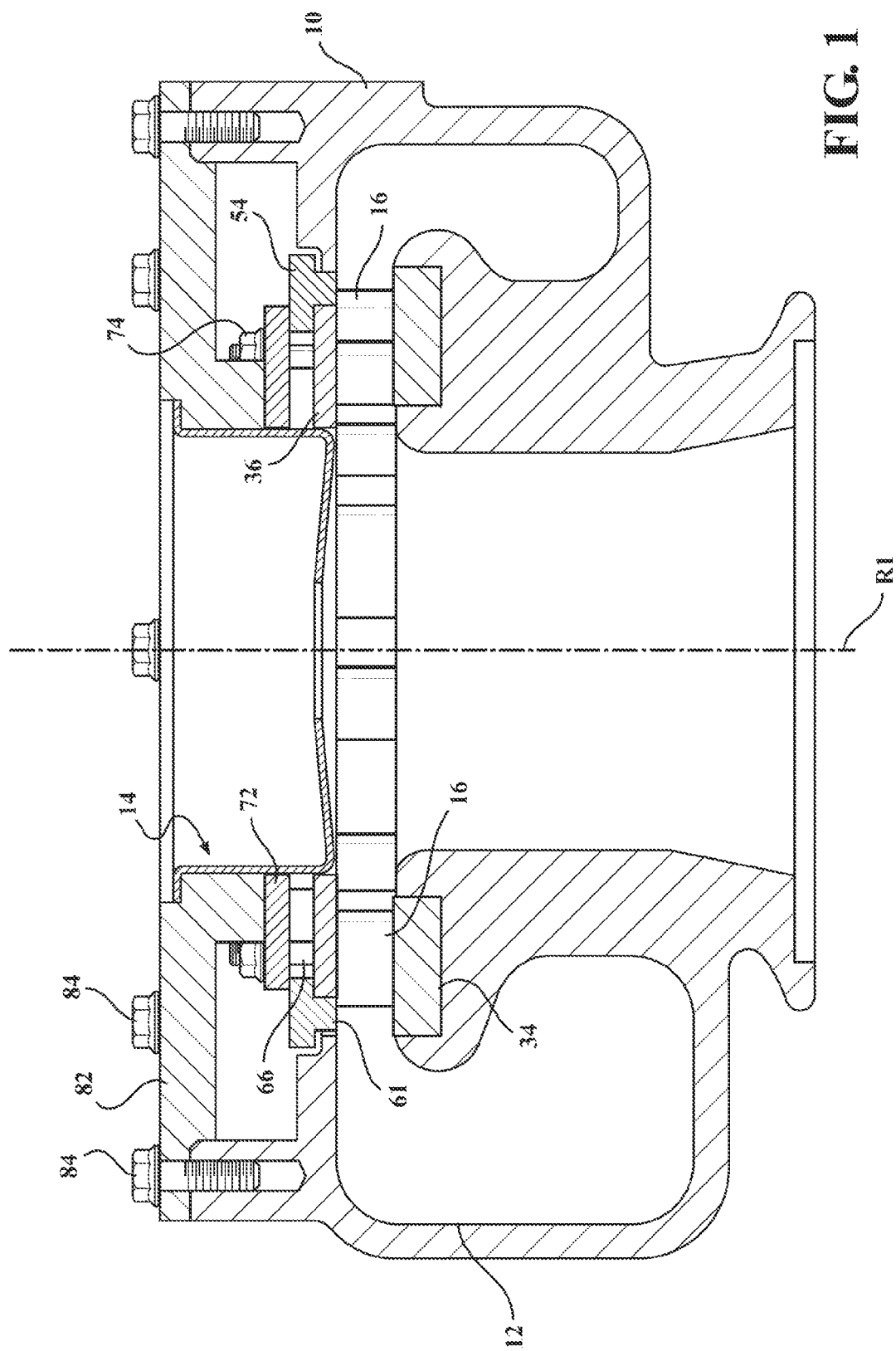
FIG. 1 is a cross-sectional view of a turbine housing with a vane pack assembly according to one embodiment of the invention.
Figure 6:
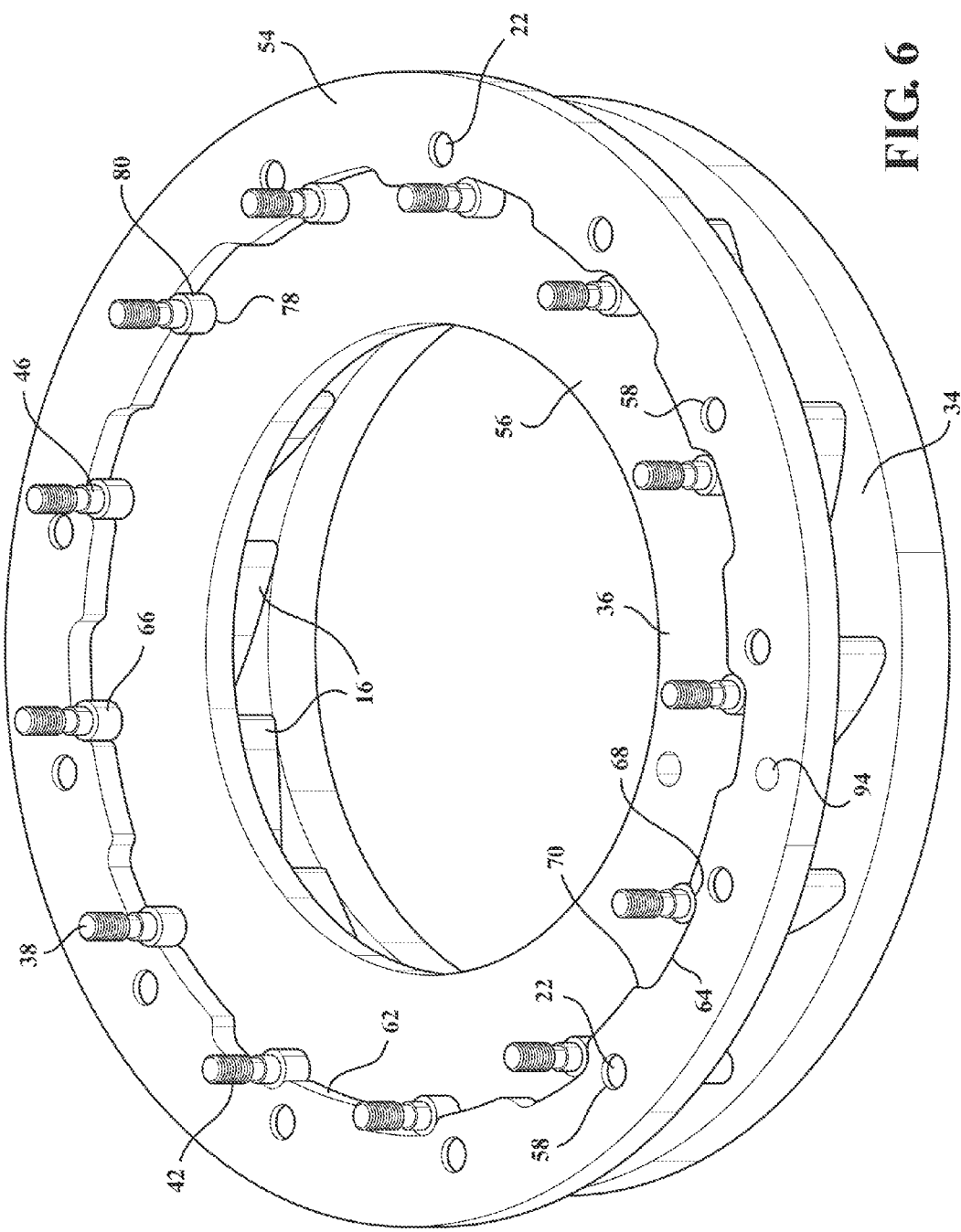
FIG. 6 is a perspective view of a partially assembled vane pack assembly illustrating the lower vane ring, the plurality of vane studs, the plurality of guide vanes, the upper vane ring, and an adjustment ring.

Referring to FIG. 6, the adjustment ring 54 is positioned adjacent to a second side 56 of the upper vane ring 36 and includes a plurality of bores 58 spaced apart in the circumferential direction. The actuation post 22 of each guide vane 16 is adjacent to an outer circumference 60 of the upper vane ring 36 and extends in the axial direction beyond the second side 56 of the upper vane ring 36. The actuation post 22 of each guide vane 16 is received in a corresponding one of the bores 58 in the adjustment ring 54. Referring to a cross-sectional view of the adjustment ring 54, as shown in FIG. 1, the adjustment ring 54 includes a lip 61 extending in the axial direction adjacent to the outer circumference 60 of the upper vane ring 36. It is appreciated that the lip 61 defines a portion of a wall for the wheel inlet 12. An inner circumference 62 of the adjustment ring 54 includes a plurality of notches 64 spaced apart in the circumferential direction. A bushing 66 is disposed on each vane stud 38. The bushing 66 encircles the adjusting portion 46 of the vane stud 38 and engages the adjustment ring 54 within the corresponding notch 64. As such, each bushing 66 is at least partially disposed in a corresponding one of the notches 64. The notches 64 extend in the circumferential direction between a first end 68 and a second end 70.

Figure 7:
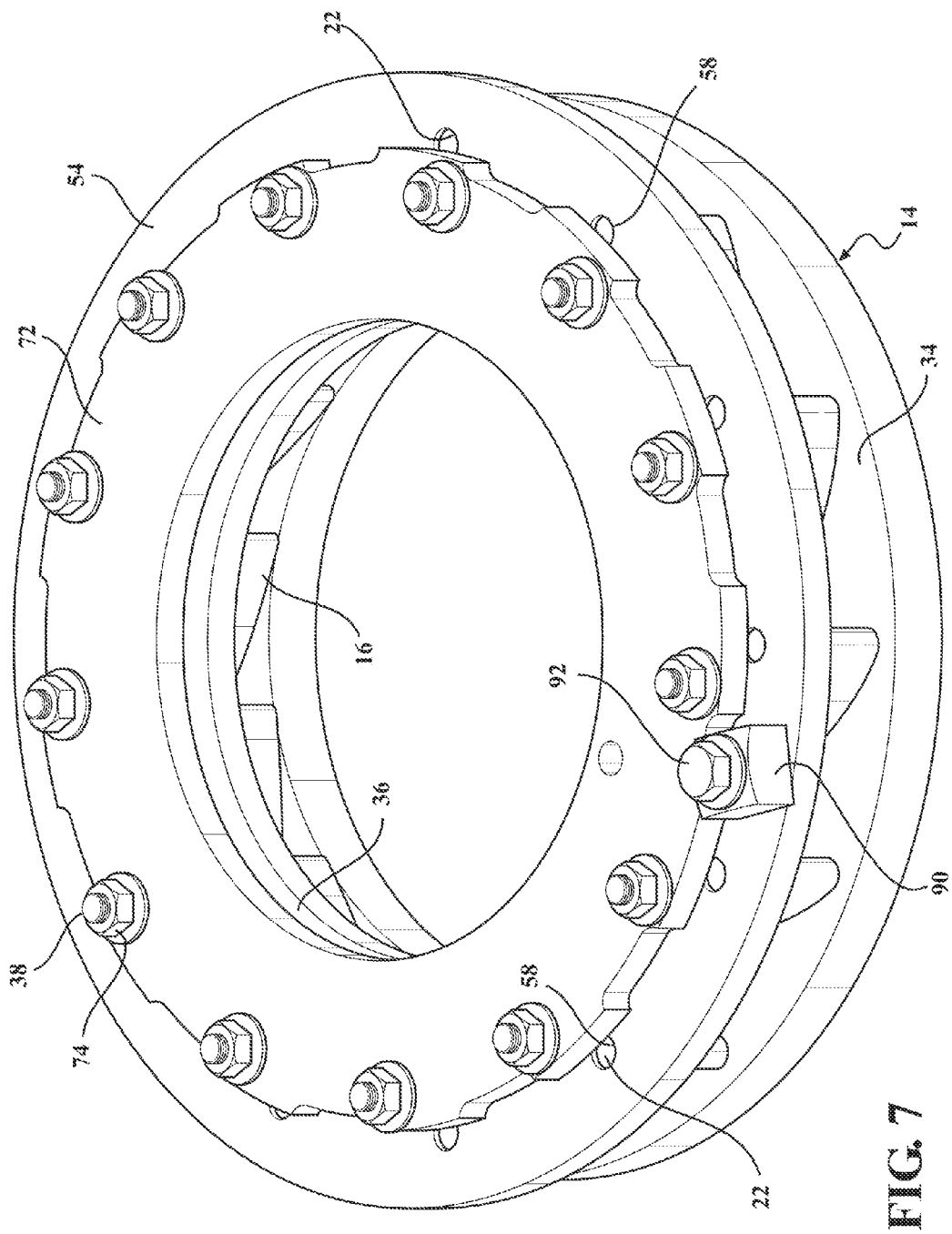
FIG. 7 is a perspective view of a partially assembled vane pack assembly illustrating the lower vane ring, the plurality of vane studs, the plurality of guide vanes, the upper vane ring, the adjustment ring, and a fixing ring.
Figure 8:
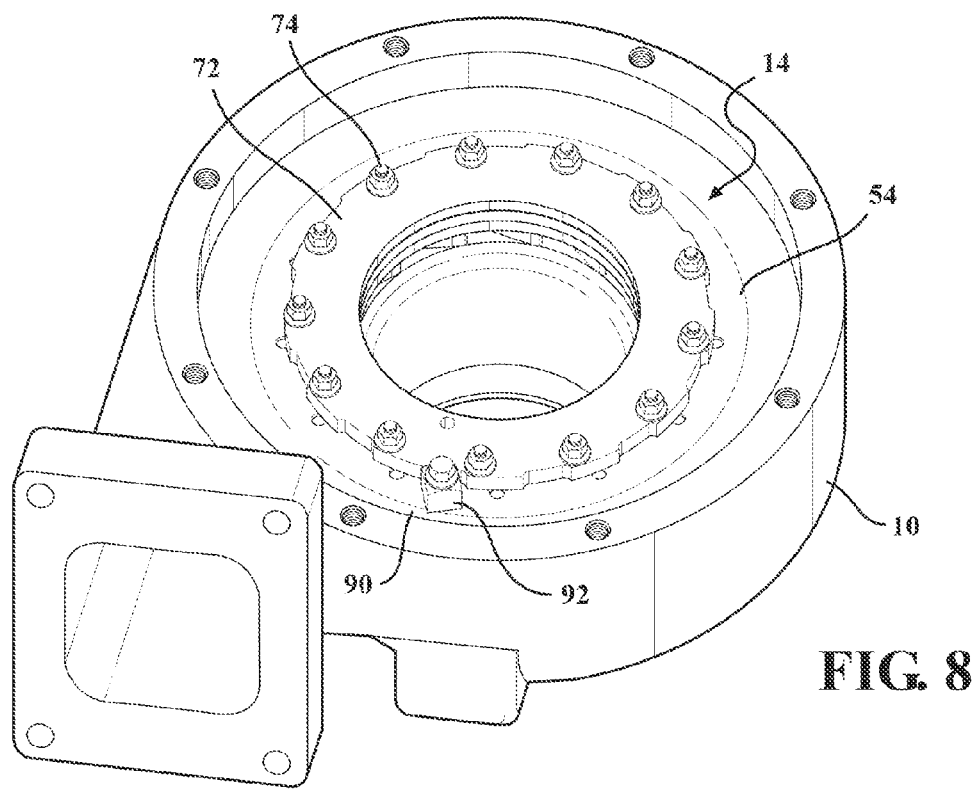
FIG. 8 is a perspective view of a partially assembled vane pack assembly illustrating the lower vane ring, the plurality of vane studs, the plurality of guide vanes, the upper vane ring, the adjustment ring, and the fixing ring positioned within the turbine housing.

Referring to FIGS. 7 and 8, a second upper vane ring or fixing ring 72 is positioned adjacent to the adjustment ring 54 and is held in place with a plurality of nuts 74 to retain the previously described components of the vane pack assembly 14 together. The fixing ring 72 includes a plurality of bores (not shown) spaced apart in the circumferential direction. The fixing ring 72 is fitted over the vane studs 38 such that the vane studs 38 extend through the plurality of bores. More specifically, the second threaded end 42 of each vane stud 38 extends through a corresponding one of the bores in the fixing ring 72 and the nuts 74 are screwed onto the second threaded end 42. A first face 78 of each bushing 66 contacts the second side 56 of the upper vane ring 36 and a second face 80 of each bushing 66 contacts the fixing ring 72 to position the fixing ring 72 in the axial direction relative to the upper vane ring 36. As such, the bushings 66 control the spacing between the upper vane ring 36 and the fixing ring 72 to provide adequate clearance for rotational movement of the adjustment ring 54.

Figure 9:
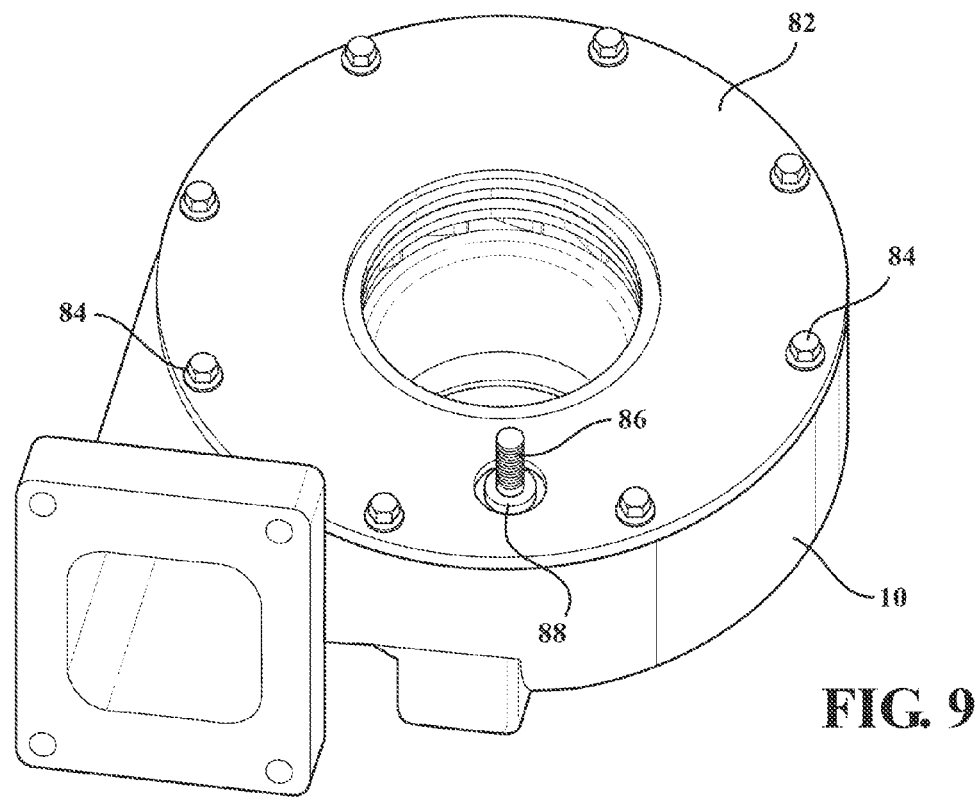
FIG. 9 is a perspective view of the turbine housing with a cover ring to retain the vane pack assembly therein.

A cover ring 82 is fixedly secured to the turbine housing 10 with a plurality of bolts 84 to retain the vane pack assembly 14 within the turbine housing 10, as shown in FIGS. 1 and 9.

In order to adjust the angular position of the guide vanes 16, an actuator device (not shown) is provided. The actuator device is operatively coupled to an actuator pivot shaft 86 that extends through the cover ring 82 and is supported by a pivot shaft bushing 88. The actuator pivot shaft 86, in turn, is operatively coupled to an actuator block 90 that is fixedly secured to the adjustment ring 54 with a bolt 92. The bolt 92 extends through the actuator block 90 and is screwed into a threaded bore 94 in the adjustment ring 54. Actuation movement of the actuator device is thereby converted into rotational movement of the adjustment ring 54.

To begin, the guide vanes 16 may be positioned in an intermediate or zero degree position, wherein the guide vanes 16 are positioned generally between the open position and the closed position. In the zero degree position, each vane stud 38 is disposed generally mid-way between the forward and rearward ends 30, 32 of the internal slot 26 in the corresponding guide vane 16 and generally mid-way between the first and second ends 68, 70 of the corresponding notch 64 in the adjustment ring 54.

In order to adjust the guide vanes 16 to the open position, the actuator device causes the adjustment ring 54 to rotate about the turbine axis of rotation R1 in the first direction (clockwise when viewed from the Figures). As the adjustment ring 54 rotates in the first direction, the adjustment ring 54 pushes the actuation post 22 on each guide vane 16 which causes the guide vanes 16 to pivot and slide relative to the vane studs 38 until the first end 68 of the notches 64 abut the bushing 66 on the vane studs 38. When the first end 68 of the notches 64 abut the bushing 66 on the vane studs 38, thereby defining the open position of the guide vanes 16, it is contemplated that there may be a small clearance between the vane studs 38 and the forward end 30 of the internal slots 26. The clearance is provided to allow for a possible build-up of exhaust debris in the internal slots 26 while still allowing the guide vanes 16 to achieve full travel. Alternatively, full travel of the guide vanes 16 to the open position may correspond with the vane studs 38 abutting the forward end 30 of the internal slots 26 without varying from the scope of the invention. The vane studs 38 act as pivot centers of the guide vanes 16. With the vane studs 38 at or near the forward end 30 of the internal slots 26, the vane studs 38 are located at approximately twenty-five percent of the chord length C of the guide vanes 16, as measured from the leading edge 18. This location of the vane studs 38 is preferable for stability of the guide vanes 16 in the open position as the exhaust gas flows through the wheel inlet 12.

In order to adjust the guide vanes 16 to the closed position, the actuator device causes the adjustment ring 54 to rotate about the turbine axis of rotation R1 in the second direction (counterclockwise when viewed from the Figures). As the adjustment ring 54 rotates in the second direction, the adjustment ring 54 pulls the actuation post 22 on each guide vane 16 which causes the guide vanes 16 to pivot and slide relative to the vane studs 38 until vane-to-vane contact occurs, thereby defining the closed position of the guide vanes 16. When the guide vanes 16 are in the closed position, it is contemplated that there may be a small clearance between the vane studs 38 and the rearward end 32 of the internal slots 26. The clearance is provided to allow for a possible build-up of exhaust debris in the internal slots 26 while still allowing the guide vanes 16 to achieve full travel. Alternatively, full travel of the guide vanes 16 to the closed position may correspond with the vane studs 38 abutting the rearward end 32 of the internal slots 26 or the bushing 66 on the vane studs 38 abutting the second end 70 of the notches 64 without varying from the scope of the invention. The vane studs 38 act as pivot centers of the guide vanes 16. With the vane studs 38 at or near the rearward end 32 of the internal slots 26, the vane studs 38 are located at approximately fifty percent of the chord length C of the guide vanes 16, as measured from the leading edge 18. This location of the vane studs 38 generally equalizes the pressure from the exhaust gas acting on the guide vanes 16 forward and rearward of the pivot center. It is contemplated that balancing the exhaust gas pressure forward and rearward of the pivot center will minimize the effort required to maintain the guide vanes 16 in the closed position.

The invention has been described here in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed:

1. A vane pack assembly (14) for a variable turbine geometry turbocharger, said vane pack assembly (14) comprising:
    a lower vane ring (34);
    an upper vane ring (36) spaced apart from said lower vane ring (34) in an axial direction,
    a plurality of guide vanes (16) spaced apart in a circumferential direction, wherein said plurality of guide vanes (16) is disposed in said axial direction between said lower vane ring (34) and said upper vane ring (36);
    a plurality of vane studs (38) fixedly secured to said lower vane ring (34), wherein each one of said plurality of vane studs (38) corresponds with one of said plurality of guide vanes (16), wherein each of said plurality of guide vanes has an elongated slot (26), wherein each of said plurality of vane studs (38) extends in said axial direction through said elongated slot (26) in its corresponding guide vane (16), and
    an adjustment ring (54) operatively coupled to the leading edge of each of said plurality of guide vanes (16) for varying said angular position of said plurality of guide vanes (16) in response to rotation of said adjustment ring (54);
    wherein a location of said plurality of vane studs (38) relative to said plurality of guide vanes (16) changes as an angular position of said plurality of guide vanes (16) is adjusted, wherein said elongated slot (26) extends between a forward end (30) and a rearward end (32), and wherein each of said plurality of vane studs (38) is disposed at said forward end (30) of said elongated slot (26) when said plurality of guide vanes (16) is in said open position, and wherein each of said plurality of vane studs (38) is disposed at said rearward end (32) of said elongated slot (26) and midway between the leading edge and trailing edge of the vane when said plurality of guide vanes (16) is in said closed position.

2. The vane pack assembly (14) as set forth in claim 1 further including:
    a fixing ring (72) adjacent to said adjustment ring (54), said fixing ring (72) coupled to said lower vane ring (34) to retain said vane pack assembly (14) together.

3. The vane pack assembly (14) as set forth in claim 1 wherein a straight line connecting a leading edge (18) and a trailing edge (20) of each of said plurality of guide vanes (16) defines a chord length (C), and wherein said plurality of vane studs (38) is disposed at twenty-five percent of said chord length (C) with said plurality of guide vanes (16) in said open position, and wherein said plurality of vane studs (38) is disposed at fifty percent of said chord length (C) with said plurality of guide vanes (16) in said closed position.

4. The vane pack assembly (14) as set forth in claim 3 wherein each of said plurality of guide vanes (16) includes an actuation post (22) extending in said axial direction, wherein said actuation post (22) is received in a corresponding bore (58) in said adjustment ring (54).

5. A vane pack assembly (14) for a variable turbine geometry turbocharger, said vane pack assembly (14) comprising:
    a lower vane ring (34);
    an upper vane ring (36) spaced apart from said lower vane ring (34) in an axial direction,
    a plurality of guide vanes (16) spaced apart in a circumferential direction, wherein said plurality of guide vanes (16) is disposed in said axial direction between said lower vane ring (34) and said upper vane ring (36);

a plurality of vane studs (38) fixedly secured to said lower vane ring (34), wherein each one of said plurality of vane studs (38) corresponds with one of said plurality of guide vanes (16), wherein each of said plurality of guide vanes has an elongated slot (26), wherein each of said plurality of vane studs (38) extends in said axial direction through said elongated slot (26) in its corresponding guide vane (16), and an adjustment ring (54) operatively coupled to the leading edge of each of said plurality of guide vanes (16) for varying said angular position of said plurality of guide vanes (16) in response to rotation of said adjustment ring (54);

wherein a location of said plurality of vane studs (38) relative to said plurality of guide vanes (16) changes as an angular position of said plurality of guide vanes (16) is adjusted, wherein said elongated slot (26) extends between a forward end (30) and a rearward end (32), and wherein each of said plurality of vane studs (38) is disposed at said forward end (30) of said elongated slot (26) when said plurality of guide vanes (16) is in said open position, and wherein each of said plurality of vane studs (38) is disposed at said rearward end (32) of said elongated slot (26) when said plurality of guide vanes (16) is in said closed position, wherein a straight line connecting a leading edge (18) and a trailing edge (20) of each of said plurality of guide vanes (16) defines a chord length (C), and wherein said plurality of vane studs (38) is disposed at twenty-five percent of said chord length (C) with said plurality of guide vanes (16) in said open position, and wherein said plurality of vane studs (38) is disposed at fifty percent of said chord length (C) with said plurality of guide vanes (16) in said closed position, wherein each of said plurality of guide vanes (16) includes an actuation post (22) extending in said axial direction, wherein said actuation post (22) is received in a corresponding bore (58) in said adjustment ring (54), wherein said upper vane ring (36) is disposed in said axial direction between said plurality of guide vanes (16) and said adjustment ring (54), and wherein said fixing ring (72) is spaced apart from said upper vane ring (36) in said axial direction.

6. The vane pack assembly (14) as set forth in claim 5 wherein each of said plurality of vane studs (38) includes a vane portion (44) having a first diameter and an adjusting portion (46) having a second diameter, wherein said first diameter is larger than said second diameter, thereby defining a shoulder (48) between said vane portion (44) and said adjusting portion (46).

7. The vane pack assembly (14) as set forth in claim 6 wherein said upper vane ring (36) abuts said shoulder (48) of each of said plurality of vane studs (38) thereby positioning said upper vane ring (36) in said axial direction relative to said lower vane ring (34) to control spacing between said lower vane ring (34) and said upper vane ring (36), thereby providing clearance for said plurality of guide vanes (16).

8. The vane pack assembly (14) as set forth in claim 7 wherein each of said plurality of vane studs (38) includes a bushing (66) disposed between said upper vane ring (36) and said fixing ring (72), wherein said upper vane ring (36) abuts a first face (78) of said bushing (66) and said fixing ring (72) abuts a second face (80) of said bushing (66), said bushing (66) positioning said fixing ring (72) in said axial direction relative to said upper vane ring (36) to control spacing between said upper vane ring (36) and said fixing ring (72), thereby providing clearance for rotational movement of said adjustment ring (54).

9. The vane pack assembly (14) as set forth in claim 8 wherein an inner circumference (62) of said adjustment ring (54) includes a plurality of notches (64) spaced apart in said circumferential direction, and wherein said bushing (66) on each of said plurality of vane studs (38) is at least partially disposed in one of said plurality of notches (64).

10. The vane pack assembly (14) as set forth in claim 9 wherein each of said plurality of notches (64) extends in said circumferential direction between a first end (68) and a second end (70), and wherein said open position is defined when said bushing (66) abuts said first end (68) of said plurality of notches (64), and said closed position is defined by vane-to-vane contact between said plurality of guide vanes (16).

11. A vane pack assembly (14) for a variable turbine geometry turbocharger, said vane pack assembly (14) comprising:

a lower vane ring (34);

an upper vane ring (36) spaced apart from said lower vane ring (34) in an axial direction;

a plurality of guide vanes (16) spaced apart in a circumferential direction and disposed in said axial direction between said lower vane ring (34) and said upper vane ring (36);

a plurality of vane studs (38), wherein each one of said plurality of vane studs (38) corresponds with one of said plurality of guide vanes (16);

an adjustment ring (54) operatively coupled to said plurality of guide vanes (16) for varying an angular position of said plurality of guide vanes (16) in response to rotation of said adjustment ring (54); and a fixing ring (72) adjacent to said adjustment ring (54), said fixing ring (72) coupled to said lower vane ring (34) to retain said vane pack assembly (14) together;

wherein a location of said plurality of vane studs (38) changes relative to said plurality of guide vanes (16) as said angular position of said plurality of guide vanes (16) is adjusted in response to rotation of said adjustment ring (54), and wherein said elongated slot (26) extends between a forward end (30) and a rearward end (32), and wherein each of said plurality of vane studs (38) is disposed at said forward end (30) of said elongated slot (26) when said plurality of guide vanes (16) is in said open position, and wherein each of said plurality of vane studs (38) is disposed at said rearward end (32) of said elongated slot (26) and midway between the leading edge and trailing edge of the vane when said plurality of guide vanes (16) is in said closed position.

12. The vane pack assembly (14) as set forth in claim 11 wherein each of said plurality of guide vanes (16) defines a chord length (C), and wherein said location of said vane stud (38) varies relative to said chord length (C) as said angular position of said plurality of guide vanes (16) is adjusted.

13. A vane pack assembly (14) for a variable turbine geometry turbocharger, said vane pack assembly (14) comprising:

a lower vane ring (34);

an upper vane ring (36) spaced apart from said lower vane ring (34) in an axial direction;

a plurality of guide vanes (16) spaced apart in a circumferential direction between said lower vane ring (34)

and said upper vane ring (36), wherein each of said plurality of guide vanes (16) includes an elongated slot (26) extending therethrough in said axial direction;

a plurality of vane studs (38) fixedly secured to said lower vane ring (34), wherein each of said plurality of vane studs (38) extends in said axial direction through said elongated slot (26) in one of said plurality of guide vanes (16);

an adjustment ring (54) operatively coupled to said plurality of guide vanes (16) for varying an angular position of said plurality of guide vanes (16) in response to rotation of said adjustment ring (54); and a fixing ring (72) adjacent to said adjustment ring (54), said fixing ring (72) coupled to said lower vane ring (34) to retain said vane pack assembly (14) together;

wherein rotation of said adjustment ring (54) in opposite first and second directions causes pivotal and sliding movement of said plurality of guide vanes (16) relative to said plurality of vane studs (38) between open and closed positions, and wherein said elongated slot (26) extends between a forward end (30) and a rearward end (32), and wherein each of said plurality of vane studs (38) is disposed at said forward end (30) of said elongated slot (26) when said plurality of guide vanes (16) is in said open position, and wherein each of said plurality of vane studs (38) is disposed at said rearward end (32) of said elongated slot (26) and midway between the leading edge and trailing edge of the vane when said plurality of guide vanes (16) is in said closed position.

\* \* \* \* \*